INVENTORS.
G. M. UITERMARK
R. J. VISSER
BY Hugh A. Kirk
ATT'Y.

March 21, 1967 G. M. UITERMARK ET AL 3,310,741

SYSTEM FOR ALTERNATELY TRANSMITTING CODED MESSAGES ON A PREDETERMINED PLURALITY OF CARRIER FREQUENCIES FROM A PLURALITY OF TRANSISTORS

Filed July 21, 1965 6 Sheets-Sheet 2

INVENTORS
G. M. UITERMARK
R. J. VISSER
BY Hugh A. Kirk
ATT'Y.

March 21, 1967 G. M. UITERMARK ET AL 3,310,741
SYSTEM FOR ALTERNATELY TRANSMITTING CODED MESSAGES ON
A PREDETERMINED PLURALITY OF CARRIER FREQUENCIES
FROM A PLURALITY OF TRANSISTORS
Filed July 21, 1965 6 Sheets-Sheet 3

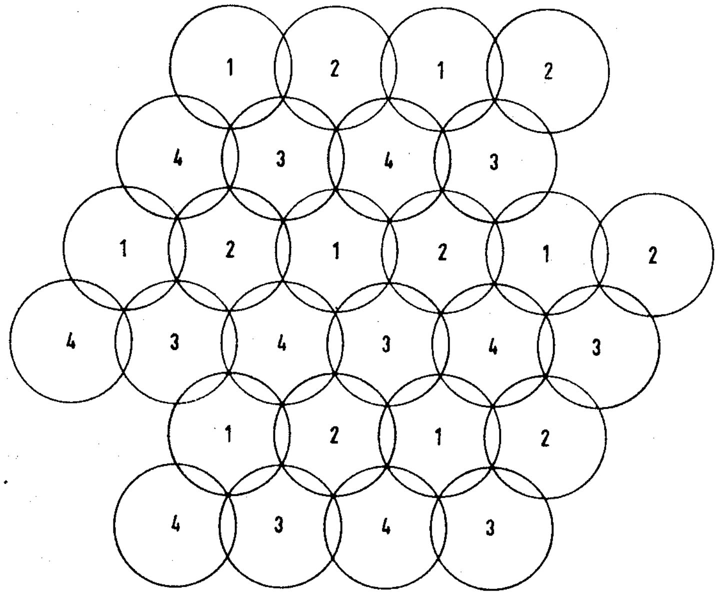

FIG. 4

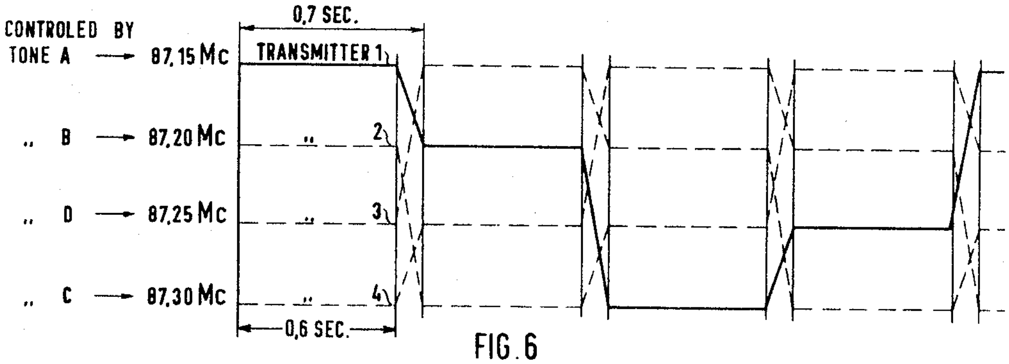

FIG. 6

| CHANNEL CONTROL TONE | OSC. X | OSC. Y | VHF CARRIERS |
|---|---|---|---|
| A | DETUNED | NORMAL FREQ. | 87, 15 Mc/s |
| B | DETUNED | DETUNED | 87, 20 Mc/s |
| C | NORMAL | DETUNED | 87, 30 Mc/s |
| D | NORMAL | NORMAL | 87, 25 Mc/s |

FIG. 9

INVENTORS.
G. M. UITERMARK
R. J. VISSER
BY Hugh A. Kirk
ATT'Y.

INVENTORS.
G. M. UITERMARK
R. J. VISSER
BY Hugh A. Kirk
ATT'Y.

March 21, 1967 G. M. UITERMARK ET AL 3,310,741

SYSTEM FOR ALTERNATELY TRANSMITTING CODED MESSAGES ON A PREDETERMINED PLURALITY OF CARRIER FREQUENCIES FROM A PLURALITY OF TRANSISTORS

Filed July 21, 1965

6 Sheets-Sheet 5

INVENTORS.
G. M. UITERMARK
R. J. VISSER
BY Hugh A. Kirk
ATTY.

March 21, 1967 G. M. UITERMARK ET AL 3,310,741

SYSTEM FOR ALTERNATELY TRANSMITTING CODED MESSAGES ON A PREDETERMINED PLURALITY OF CARRIER FREQUENCIES FROM A PLURALITY OF TRANSISTORS

Filed July 21, 1965 6 Sheets-Sheet 6

INVENTORS.
G. M. UITERMARK
R. J. VISSER
BY Hugh A. Kirk
ATT'Y.

3,310,741

SYSTEM FOR ALTERNATELY TRANSMITTING CODED MESSAGES ON A PREDETERMINED PLURALITY OF CARRIER FREQUENCIES FROM A PLURALITY OF TRANSISTORS

Gerardus Martinus Uitermark, Voorschoten, and Rienk Jan Visser, The Hague, Netherlands, assignors to De Staat der Nederlanden, ten deze Vertegenwoordigd Door de Directeur-Generaal der Posterijen, Telegrafie en Telefonie, The Hague, Netherlands Filed July 21, 1965, Ser. No. 473,729
15 Claims. (Cl. 325—39)

This application is a continuation-in-part application of applicants' copending U.S. patent application Ser. No. 237,141 filed Nov. 13, 1962, now abandoned.

This invention relates to a system for transmitting coded messages, including calling signals, by means of a predetermined number of audio frequencies by which a carrier frequency is modulated, comprising one or more transmitters and one or more groups of mobile and/or stationary receivers.

More particularly this invention deals with such a system in which two or more transmitters having overlapping spheres of action simultaneously transmit on different frequencies which alternate back and forth with the same message whereby a mobile receiver in the area of either sphere can receive the message without changing the tuning of his receiver.

Previously a receiver which could not change its tuning frequency was required to move only within the sphere of action of the transmitter transmitting the frequency to which it was tuned, which sphere of action practically covers a circular area drawn with a certain radius around the location of the fixed transmitter. However, it is also possible that the area of movement of the receiver does not entirely coincide with this circular surface but lies partially outside of it and in these outside parts the mobile receiver must also be reached from the transmitter. In such a case a second transmitter can be installed in an adjacent area for transmitting the same message on another wavelength but the receiver must be switched over from one wavelength to the other when passing from one sphere of action to the other sphere of action. If the receiver switching operation is not used and the second transmitter is given the same wavelength as the first, the message can be transmitted via both transmitters at the same time but this procedure may cause the transmitters to interfere or disturb one another. The receiver can receive the signal in two different ways. One way is that the two signals have different phases, but this may lead to a decrease of the total field strength received; and the other way is that frequency modulation may be employed, but noise or distortion may appear in the receiver if the distances travelled by the radio waves from the two transmitters are different; that is, when the instantaneous frequency received from one transmitter differs from that received from the other transmitter. Since this difference varies continually as the receiver moves, this intermodulation gives rise to different frequencies resulting in a low signal to noise ratio.

Accordingly it is an object of the present invention to overcome the above prior art disadvantages and simplify the present system as well as to make it possible to extend it to any particular area regardless of its size.

Another object of this invention is to provide a system containing at least two transmitters and to shift the carrier frequency or central frequency of one transmitter periodically from the first value to the second and at the same time to shift the carrier frequency of the other or adjacent transmitter synchronously and periodically from the second frequency to the first so that both transmitters are transmitting simultaneously but on different frequencies which difference in frequency alternates periodically.

Another object is to provide a system in which the two transmitters do not interfere with each other within the coincident parts of the two spheres of action.

Another object is to provide a system in which the same signal is transmitted alternately over each of said transmitters on the same carrier frequency.

Another object is to provide such a system in which the receiver when passing from one sphere of action of one transmitter to that of another need not change over its channel or reception frequency of the wavelength.

A further object of this invention is to provide a system in which the number of different receivers which can be used is doubled, whereas the traffic capacity of either transmitter is maintained. That is, one carrier frequency can serve to establish a connection with one or more receivers of a first group and the other carrier frequency can serve to establish a connection with one or more receivers of a second group.

Still another object is to provide a system in which by use of four different carrier frequencies and a plurality of properly located transmitters, any area can be completely covered by the communication system of this invention.

A still further object of this invention is to keep transient phenomena between the transmitters as low as possible.

Generally speaking, this invention comprises a telecommunication system for multi-element code signals modulated on a predetermined plurality of different radio frequency carrier waves. Although two, three, or more transmitters having overlapping spheres of action may be used in this system, if four different carrier frequencies or waves are employed and transmitted over equally spaced transmitters of the same range or sphere of action, so that the circular areas of their spheres of action overlap 60° along the circumference of said circular areas, any given area can be covered by the system. Thus any mobile or stationary receiver in such a given area and tuned to any one of these four frequencies can be sent messages from these transmitters. According to this system all the transmitters are transmititng over one of the predetermined frequencies simultaneously, but adjacent transmitters having overlapping areas of action transmit over different carrier frequencies, which carrier frequencies are simultaneously switched or alternated for all of the stations so that within a predetermined interval of usually less than a few seconds, each transmitter will have transmitted at least one multi-element signal on each of the different carrier frequencies. Thus with four different frequencies and four adjacent transmitters the changing occurs so that the one transmitter transmitting the first frequency transmits the third, the one transmitting the second frequency transmits the first, the one transmitting the third frequency transmits the fourth, and the one transmitting the fourth frequency transmits the second, or some similar arrangement, and so on repeating this cycle after each multi-element signal is transmitted. The number of different receivers which can be called corresponds to the number of different combinations of different elements which can be used for calling and identifying purposes in each multi-element signal, times the different number of frequencies employed in the area, which in this case is four.

A central control system or exchange is provided for sequentially controlling and switching the carrier frequencies of the different transmitters in the area. These different carrier frequencies may be coded on audio frequency signals corresponding to each of the different carrier frequencies. This central control system or exchange may be connected, such as by dial telephone, to a subscriber of this communication service so that by dialing certain bits of information, these bits may be automatically converted in the exchange to the calling elements of a specific receiver to which communication is to be made, together with the coded message elements of the multi-element signal to be transmitted.

For example, according to the system described in one of applicants' copending applications Ser. No. 10,341 filed Feb. 23, 1960, now U.S. Patent No. 3,238,503 issued Mar. 1, 1966, a six-element signal is used preceded by a space having the duration of one element during which space the changing of the carrier frequencies of the transmitters according to the present system may be accomplished. The first three of the six signal elements may comprise calling elements, each of which elements may be modulated a plurality, say 30, different ways, and the receiver to be contacted will have selector circuits tuned to the three specific modulated elements of its call which selectors may be successively triggered as each element is received and detected. The fourth element of each signal may be a pilot or identification element for which a separate additional selector may be tuned, which fourth element may also operate a signalling means to notify the person at that receiver that a message is being sent to him. The last two elements of the signal are the coded message elements and preferably are modulated in the same way as the three calling elements, which permits a combination of six different coded messages on each multi-element signal, that is, three different combinations of two different successively modulated elements. By modulating the coded message elements in the same way as the calling elements, the same detector circuits can be used for both; and the fourth, pilot, or identification element may be used to simultaneously alert all of the detectors for the detection of the coded message, which then can trigger one of six different visual and/or audible means to notify the person at the receiver. Thus for example, if a shipper of goods has trucks with such tuned receivers throughout a given area, the truck driver may be instructed before his departure that if he receives certain ones of the six different coded messages or combinations of lights on his dashboard, he is to do certain things, such as continue his route, turn back, call the main office, etc. Each multi-element signal is preferably repeated every few seconds for a certain number of minutes to be sure that the receiver to be reached will be able to receive the message sent to it, such as if a driver with a mobile receiver is under a bridge or a viaduct or is shielded from radio waves at the time his first signal was transmitted.

The above mentioned and other features and objects of this invention and the manner of attaining them will become more apparent and the invention itself will be understood best by reference to the following description of embodiments of the invention taken in conjunction with the accompanying drawings, wherein:

FIG. 4 is a schematic diagram of the overlapping areas covered by the spheres of action of a large plurality of equal strength transmitters, wherein the whole area may be covered by simultaneously transmitting on only four different alternately and sequentially transmitted carrier frequencies;

Figure 7:
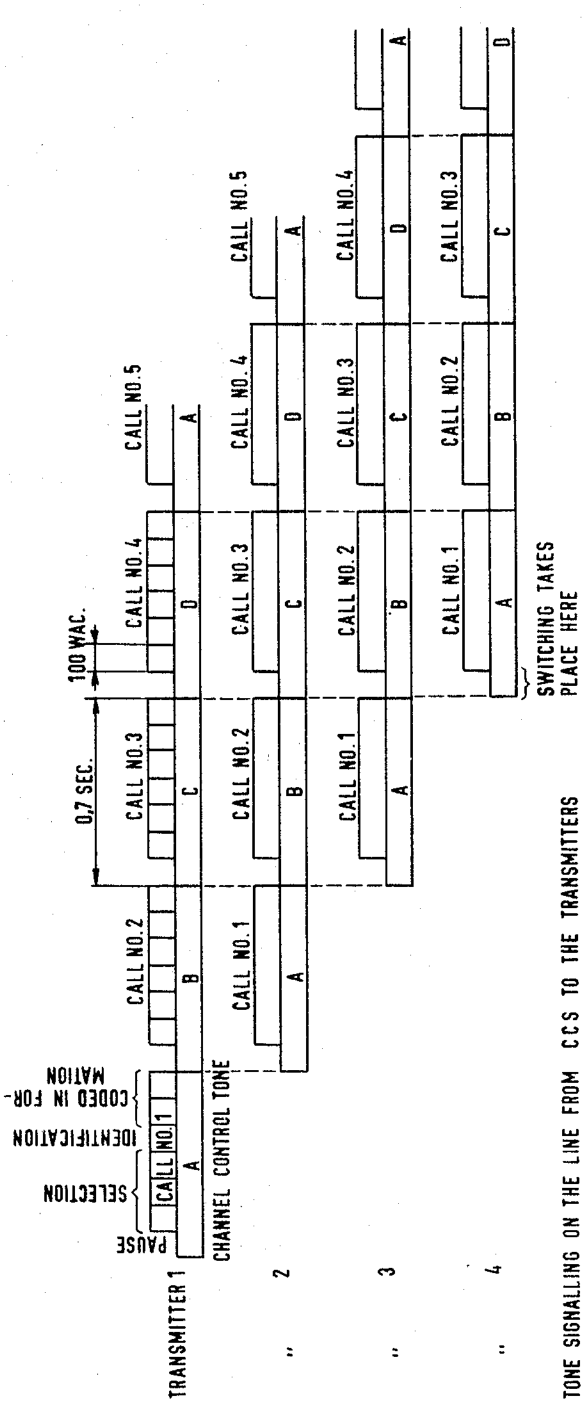
Figure 5C:
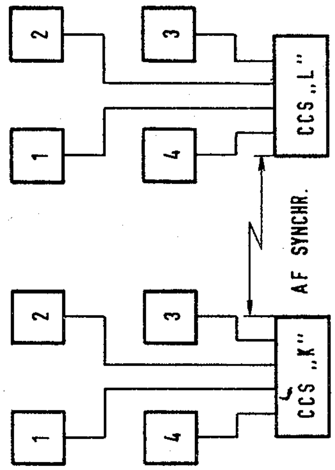
Figure 5B:
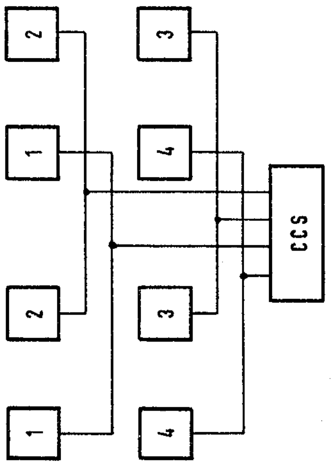
Figure 5A:
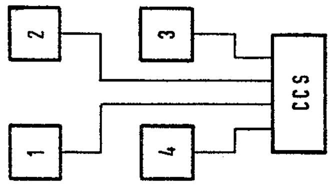
Figure 8A:
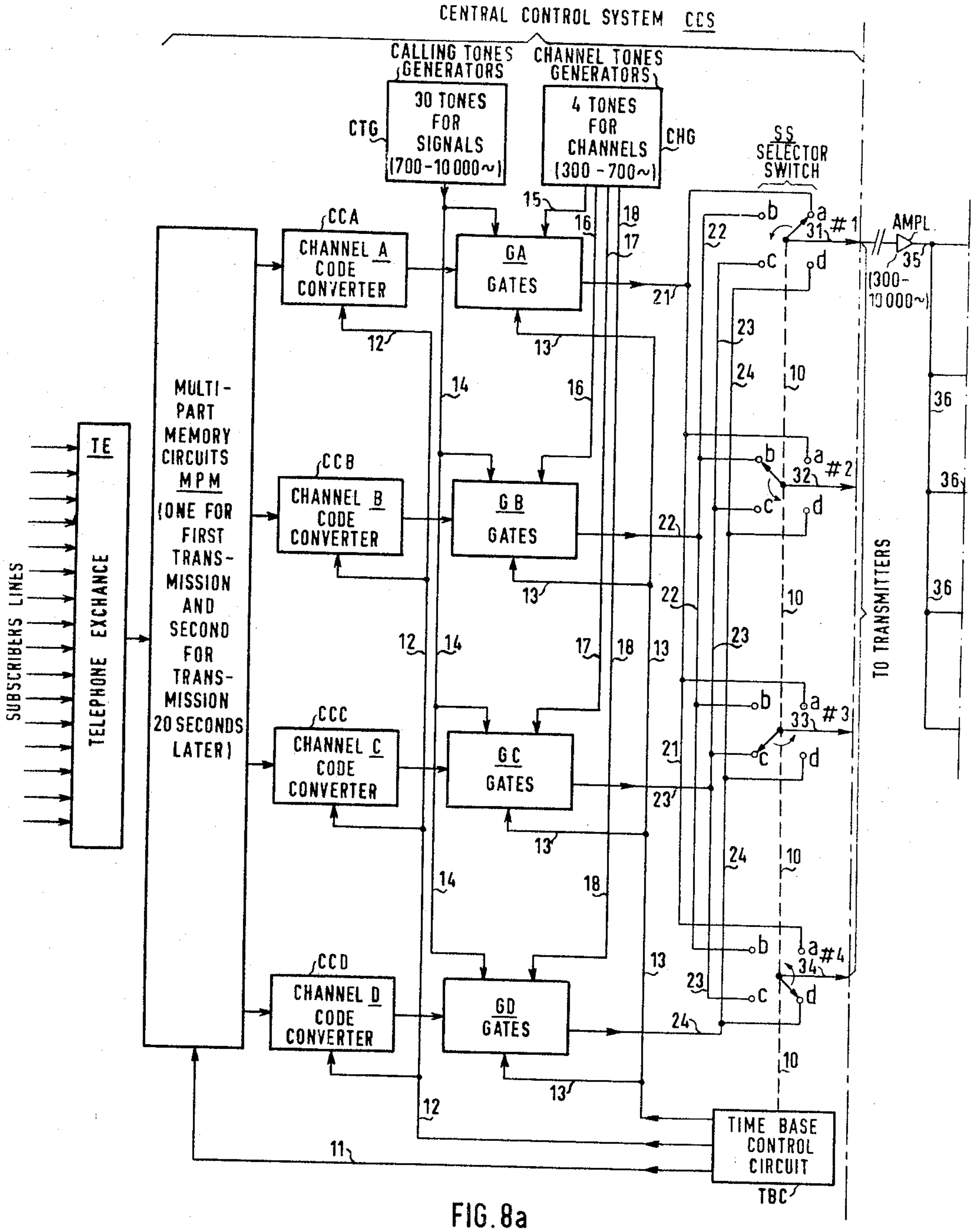
Figure 8B:
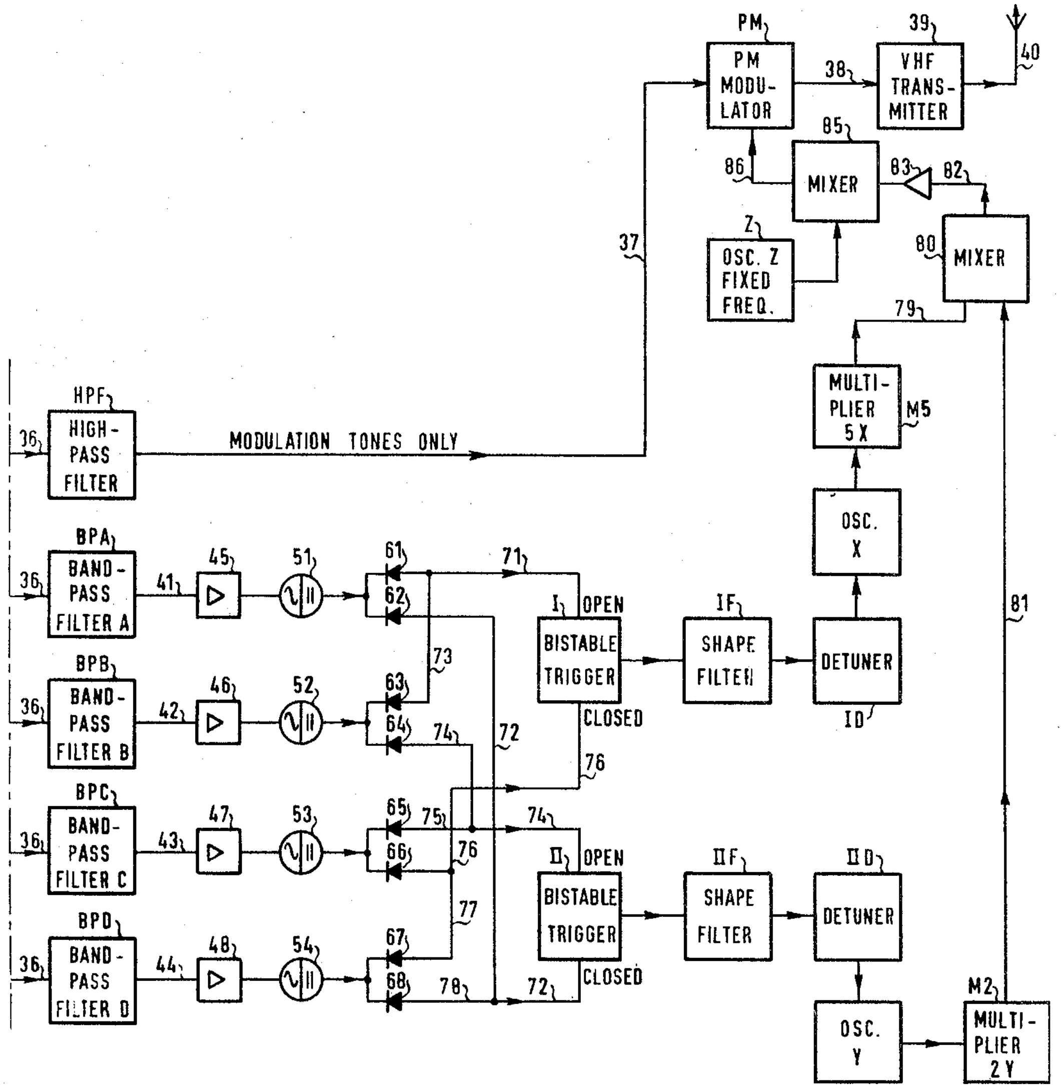

FIGS. 5*a*, 5*b* and 5*c* are schematic block diagrams of the different connections of a central control exchange to four transmitters simultaneously transmitting on different carrier frequencies in a system according to that shown in the diagram of FIG. 4;

FIG. 6 is a time diagram of the cycles of simultaneous transmission of the signals over four different carrier frequencies or channels from four adjacent transmitters and the simultaneous switching of the carriers or channels between them such as for a system according to that shown in FIG. 4;

FIG. 7 is a time diagram of the four channel tones with their super-imposed multi-element code signals that are communicated from the central control exchange, system, or station to each of four adjacent transmitters for simultaneous transmission shown according to the diagrams in FIGS. 4, 5 and 6;

FIGS. 8*a* and 8*b* together comprise a block wiring diagram of one embodiment of a central control station or system (FIG. 8*a*) with its selective switching means and one of the four transmitter stations (FIG. 8*b*) connected thereto for modulating and generating the four different carrier frequency channels for the signals to be transmitted according to the system shown in FIGS. 4, 5 and 6; and FIG. 9 is a chart of the sequence of switching of the oscillators for producing the four different carrier frequencies corresponding to the four channels shown in FIGS. 6 and 7 and the block wiring diagram shown in FIGS. 8*a* and 8*b*.

In a field of application of the system according to this invention, a call is transmitted followed by certain information. The total time required for transmitting these signals amounts to approximately 700 milliseconds or seven tenths of a second. Now referring to FIG. 1 the transmitter R transmits this call and information during 700 milliseconds, say on frequency A to the receiver O mobile within its sphere of action indicated by the circle S*r*, which receiver O is selective for the frequency A. In the next 700 milliseconds this transmitter R transmits on frequency B. The other transmitter S first transmits for 700 milliseconds on frequency B which transmitter S has an area of action indicated by the circle S*s*, while the first transmitter R transmits on the frequency A, and then the second or other transmitter S transmits on frequency A to receiver O′ also tuned to frequency A (or if receiver O has moved to the position O′), while the first transmitter transmits on frequency B. Thus the frequencies together with their message signals alternate synchronously in the two transmitters R and S. Furthermore, due to this periodic frequency shift, a subscriber's station which is often called, that is for example, one belonging to the group of receivers tuned to frequency A, can be transferred to the group tuned to the frequency B, if the frequency A group of subscribers is already crowded.

Figures 1, 2:
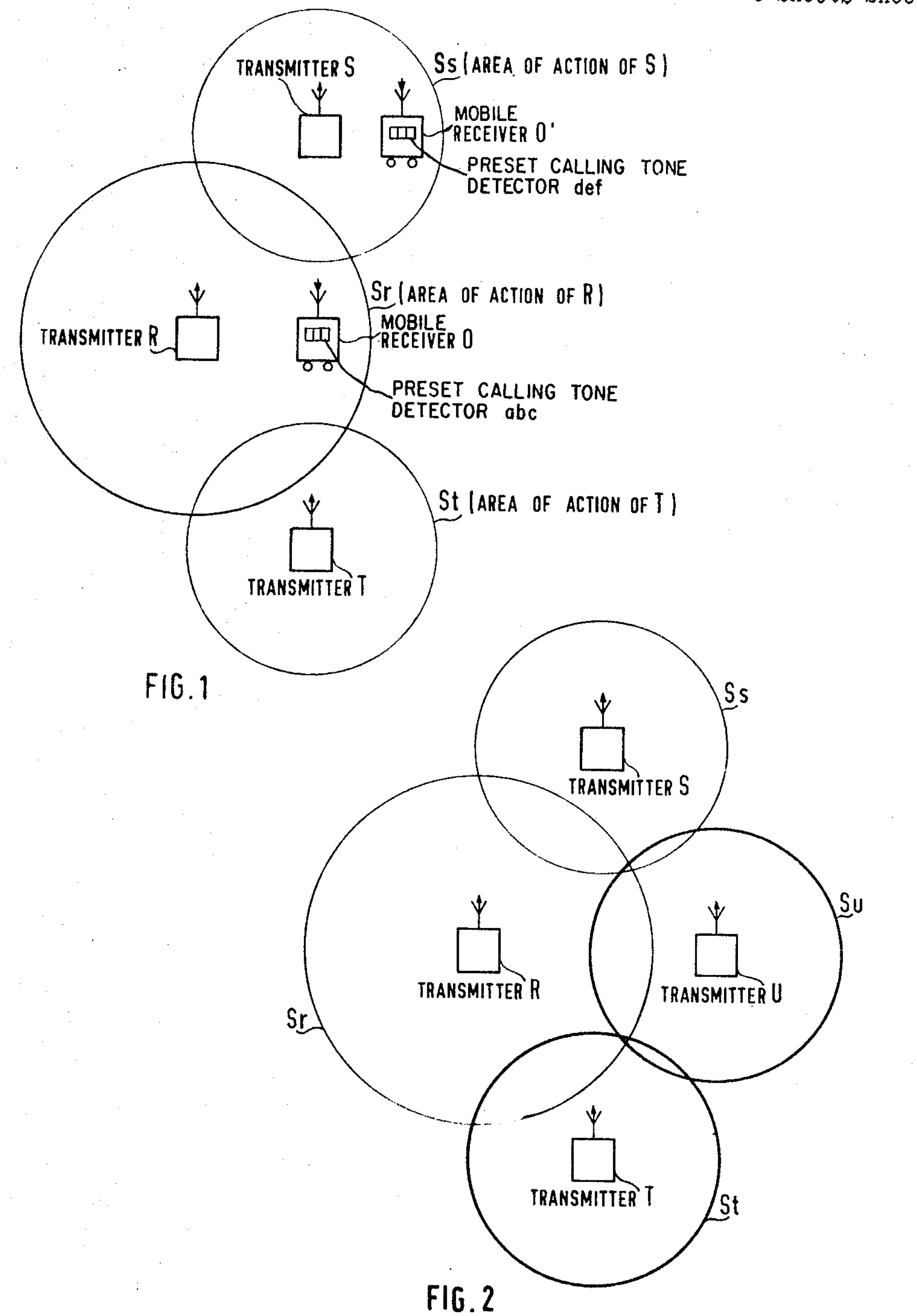
FIG. 1 is a schematic diagram of the overlapping areas covered by the spheres of action of three different transmitters.
FIG. 2 is a schematic diagram of the overlapping areas covered by the spheres of action of four different transmitters.

The system may still be extended by a transmitter T shown in FIG. 1 having a sphere of action indicated by circle S*t*. If this sphere of action S*t* of this transmitter T partly coincides with that sphere of action S*r* of transmitter R, but does not intefere or overlap with the sphere of action S*s* of transmitter S, then the frequency sequence of transmitter T can be the same as that of transmitter S, so that the transmitters S and T simultaneously transmit the frequency A followed by the frequency B together with their message signals, while the transmitter R transmits the frequencies B and then A together with their message signals, respectively, in these intervals. Similarly the system can be further extended by more transmitters at the periphery of the primary or central sphere of action S*r* of the transmitter R, in which the other or surrounding transmitters have the same frequency shift sequence as the transmitters S and T, providing the spheres of action S*s* and S*t* of the secondary transmitters S and T do not overlap or coincide with each other.

If between the transmitters S and T, one more transmitter U would have to be located as shown in FIG. 2, the sphere of action S*u* of which would partially coincide with the spheres of action S*s* and S*t* of transmitters S and T, respectively, as well as the primary transmitter sphere of action S*r*, a shifting of three frequencies A, B and C together with their corresponding message signals would have to be used. In this case the transmitter R could, for example, transmit messages over the sequence A, B and C in separate intervals in rotation, and both the transmitters S and T could transmit messages simultaneously over the sequence B, C and A since their spheres of action do not overlap, as was described above in accordance with FIG. 1, but the sequence of transmitter U would have to transmit messages over a third sequence C, A and B.

Figure 3:
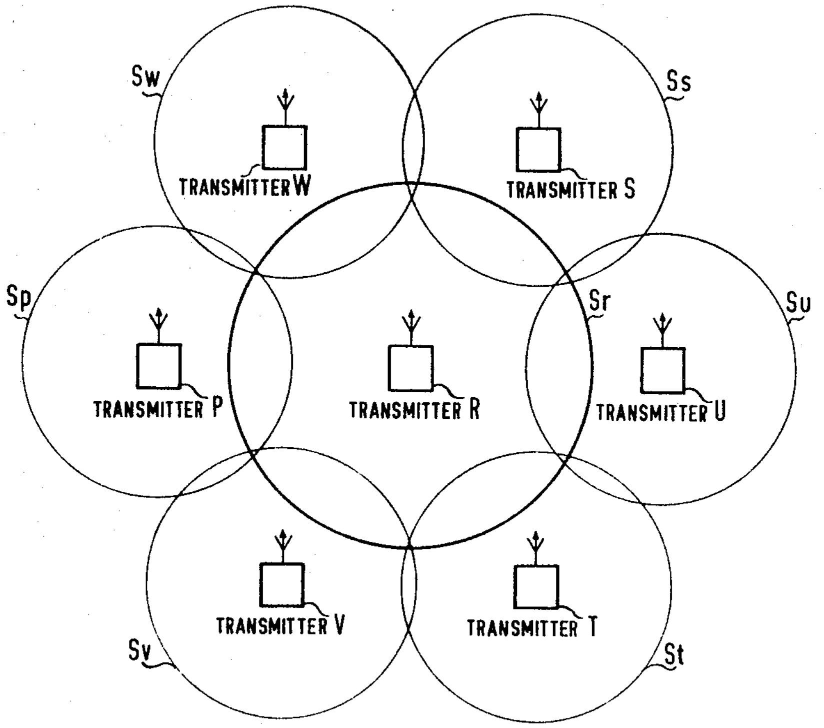
FIG. 3 is a schematic diagram of the overlapping areas covered by the spheres of action of seven different transmitters, alternate circumferential ones of which may be connected to transmit on the same carrier frequency without interference.

In this manner the peripheral area of the sphere of action S*r* of the transmitter R could be filled as shown in FIG. 3, wherein the frequency sequences of the different groups of transmitters could be according to the following table:

| Transmitter: | Frequency sequence |
|---|---|
| R | A, C, B |
| S, T, P | B, A, C |
| U, V, W | C, B, A |

Thus the three transmitters S, T and P having corresponding spheres of action S*s*, S*t* and S*p* do not overlap with each other and can be joined to have the same frequency sequence which is transmitted over all three of these transmitters simultaneously. Similarly the additional transmitters U, V and W having spheres of action S*u*, S*v* and S*w*, since they do not overlap each other, also can have the same sequence of frequencies transmitted over them simultaneously.

Thus, outside of all the spheres of action shown in FIG. 3, still other transmitters can be installed with frequency sequences in which adjoining sequences are different, without any need for frequency or wavelength switch-over at the receivers anywhere within the range of any of the transmitters.

Referring now to FIG. 4 there is illustrated therein how substantially any area can be covered by the system of this invention comprising a plurality of equally spaced transmitters of the same spheres of action or strength so as to produce overlapping equal circular areas of action every 60° around their peripheries, by applying only four different carrier or transmitting frequencies corresponding to the numbers 1, 2, 3 and 4 shown in the circles in FIG. 4. Thus any circuit area chosen in FIG. 4 is overlapped only by similar areas having different carrier frequencies or numbers, and the surrounding overlapping circles are arranged so that no two adjoining circular areas of action have the same transmitting frequency or number. Thus by adding one more change of frequency than that shown in the system schematically shown in FIG. 3, circular areas of action can be interlocked and extended in any direction to cover any desired area, such as for example, a whole country or even a whole continent, or any parts thereof, whether the parts are contiguous or not, so long as the transmitters themselves can be connected together and controlled by a central control system or station CCS, as shown in the block diagrams of FIGS. 5*a*, 5*b*, 5*c* and 8*a*.

There is shown in FIG. 5*a* an arrangement of how the four different transmitters having carrier frequencies 1, 2, 3 and 4 are separately connected to a central control station CCS which controls the simultaneous switching of the four different carrier frequencies cyclically around the four transmitters. If more than four transmitters are employed, then they may be connected as shown in FIG. 5*b*, so that all identical numbered transmitters are connected together to the common central control station CCS. Thus the traffic capacity or the number of calls which can be transmitted per hour, over four different carrier frequencies is constant, and is independent of the number of additional transmitters over four, when each call signal is sent four successive times.

On the other hand, if the traffic capacity of a given area is to be enlarged, the second group of four transmitters is given its own central control station with its own identification tone. This doubles the traffic capacity by dividing the total area into two groups of transmitters as shown schematically in FIG. 5*c*, in which one group of transmitters is controlled by the central control station CCS K and the other group of transmitters is controlled by the central control station CCS L. The only restrictions for such a system, however, are that (a) the sequence of the channels or carrier frequencies of the second group be coordinated with the sequence of the first group, and that (b) the changing of the channels or carrier frequencies be done in both groups at substantially the same time or during the space therefor provided between signals. In this respect other groups of four transmitters may be provided with other central control stations, if still further traffic capacity is required, and sufficient area is involved. These different groups may be identified by using different pilot or identification tones modulated on the fourth element of each multi-element signal, and thus avoid having to change the first three calling elements of the signals already employed. Thus if a receiver moves from a group K area of the first group of four transmitters into a group L area of the second group of four transmitters, it can only be called by passing the call through the central control station of group L and informing the central control station CCS L that the call should comprise an identification tone K instead of its normally transmitted identification tone L which central control station CCS L normally incorporates in its calls. In this way mobile receivers with the same selection or calling tones or elements can belong to different systems or groups K and L, and be distinguished solely by their identification tones or elements in their specific signals.

Referring now to FIG. 6 there is shown a time diagram for a group of four transmitters, 1, 2, 3 and 4 in a system according to FIG. 4 which broadcast simultaneously on four different carrier frequencies of say 87.15 megacycles, 87.20 megacycles, 87.25 megacycles and 87.30 megacycles, respectively, during the first 0.6 second of each 0.7 second period, the last 100 milliseconds or one tenth second being employed for the shifting or changing over of the carrier frequencies among the four transmitters as shown by the four steps in the megacycle lines in the chart of FIG. 6. To complete one cycle of operation of 2.8 seconds, each signal is transmitted four times, once over each of the four different transmitters of each group, thereby being broadcast once over their entire area. The changes in frequency shown in this FIG. 6 are so arranged that no change will be greater than that of two steps of 50 kilocycles each or 100 kilocycles at one time, in that each step gives rise to transient phenomena and the greater the step the greater the transient phenomena, which phenomena should be kept as small as possible. This is the reason that the four successively higher transmitting frequencies are not identified, respectively, in sequence by tones A, B, C, and D, but instead the order of the control tones is A, B, D, C, as shown in the left-hand column of FIG. 6.

In FIG. 7 the four channel frequency control tones are identified as A, B, C and D for the transmitters 1, 2, 3 and 4, respectively (see also FIG. 6), which tones are generated at the central control station CCS (see FIG. 8*a*) upon which the six-element signal tones are modulated. The first three elements are the calling or receiver selection elements, the fourth is the pilot or identification element, and the last two elements are the coded information or message elements. For example, if thirty different signal element modulation tones were employed within the audio range between about 700 and 10,000 cycles per second and no one of these different tones are used twice in succession, in order to control the sequential order of the selectors in the receivers, the system would have a capacity for 25,230 different calls or receivers. By transmitting a different one of these six-element calls every 0.7 second, the hourly capacity of the system would be about 2,570 calls. The channel or carrier frequency control tones A, B, C and D may be selected from the range of audio frequencies between 300 and 700 cycles, below the above mentioned audio range for the different signal elements, which carrier frequency control tones are combined with the signal element tone frequencies and transmitted from the central control station CCS in accordance with the block wiring diagram shown in FIG. 8*a*.

FIG. 8*a* discloses schematically a four-brush four-bank and four-contact rotary selector type of selector and timing switch SS with each of its four brushes on a different one of its four contacts, corresponding to each of the channel or carrier frequency selection control tones or frequencies A, B, C and D. This selector switch SS, however, may be electronic instead of mechanical without departing from the scope of this invention.

As stated above, super-imposed upon one of the channel tones A, B, C and D, are three or four of the thirty different signal element calling tones, which three or four calling signal tones are selected by the subscribers to the system.

Referring more specifically to FIG. 8*a*, there is shown a plurality of lines along the left hand margin of the subscribers to the particular system of this invention, which subscribers may be connected through a telephone exchange TE wherein certain primary digits of a number the subscriber may use, immediately connects them to the central control system CCS of this invention. The first part of this system CCS comprises a multi-part memory circuit MPM, one part for each of the four different channel selecting tones A, B, C and D; each part of which may comprise a series of, say twenty (20), registers in which the signals to be transmitted are stored and rotated. The signals that are put in these memories are continuously rotated so that they will be repeated every rotation of the twenty different signals, which rotation may comprise the repetition sequence of the signals which are sent over each channel. This rotation and shifting of the signals is controlled by a time-base control circuit TBC, which also controls all the other operations of the central control system CCS, including that of the rotation of the selector switch SS by the mechanical connection between the parts thereof indicated by the dotted line 10. Thus the multi-part memory circuit MPM transmits each signal say once every twenty seconds and this is repeated for several minutes to be sure that the mobile receiver will receive the call, which several minutes of repetition is also controlled by the time-base circuit TBC. The memory circuits MPM are connected by means of gates therein to each of the separate channel code converters CCA, CCB, CCC and CCD which are also controlled via a connection 12 from the time-base circuit TBC for converting the code signals from the subscribers into the particular code to be transmitted according to the above mentioned copending application Ser. No. 10,341, and as shown diagrammatically as six successive signal elements in FIG. 7. Each channel code converter CCA, CCB, CCC, and CCD is connected to a corresponding gate circuit GA, GB, GC and GD, respectively, which is controlled also by the time-base circuit TBC via a connection 13. Introduced into each of said gate circuits GA, GB, GC and GD are the thirty different signal tones from the calling tone generators CTG via conductors 14, and also the four separate channel tones from the channel tone generators CHG via conductors 15, 16, 17 and 18, respectively, for tones A, B, C and D. The output of each of these gates GA through GD are correspondingly multiplied to the separate four channel tone contacts *a*, *b*, *c* and *d* of each of the four banks in the selector switch SS via conductors 21, 22, 23 and 24, respectively, so that the output of each one of the four tone channels A, B, C and D are successively connected to all of the four different transmitters 1, 2, 3 and 4 via conductors 31, 32, 33 and 34.

In FIG. 8*b* there is shown a block diagram of only transmitter 1 of the four transmitters 1, 2, 3 and 4 connected to the central control station CCS of FIG. 8*a*. Thus the conductor 31 may be passed through an amplifier 35 shown in FIG. 8*a* and thence multiplied via multiple conductor 36 which are connected to each of the five band-pass filters shown on the left side of FIG. 8*b*. Thus in this conductor 36 there is passed not only the three, four or five different calling frequency tones from the signal tone generators CTG which are to be sent to a particular receiver, including its selection tones, its identification tone and the message tones, but also one of the four channel frequency tones A, B, C or D which corresponds to the tuned frequency of that receiver which is to be reached.

Referring now specifically to FIG. 8*b* the high pass filter HPF passes all of the calling frequency tones, namely those above 700 cycles, directly via conductor 37 to the pulse modulator PM where it is modulated on the proper one of the four different carrier frequencies corresponding to one of the tones A, B, C or D. Then this modulated signal is conducted via conductor 38 to the VHF transmitter 39, and on to radio antenna 40 to be radiated to the desired receiver if said receiver is within its sphere of action.

The desired channel selection tone A, B, C or D is selected in one of the band-pass filters BPA, BPB, BPC and BPD, respectively, depending upon which of the tones is connected at that time via the contact *a*, *b*, *c* or *d* of the selector switch SS of FIG. 8*a*. Thus the output of the one band-pass filter which is operated during any one 0.7 second period is passed via conductor 41, 42, 43 or 44 to an amplifier 45, 46, 47 or 48, respectively, and thence through a rectifier 51, 52, 53 or 54 to produce a direct current pulse passed through diode gates 61 through 68 to open and/or close the two bi-stable triggers I and II. For example, as shown in FIG. 8*a*, contact *a* of the selector switch SS transmits the channel selection tone A through the conductor 36 which passes through band-pass filter BPA and conductor 41, to operate amplifier 45, rectifier 51, and diodes 61 and 62, the former diode 61 passing a pulse via conductor 71 to open the bi-stable trigger I and the diode 62 passing a pulse via conductor 72 to close the bi-stable trigger II. This opening of bi-stable trigger I operates the shape filter IF to operate to de-tuner ID to change the frequency of oscillator X a predetermined normal frequency or kilocycles per second, which resulting changed frequency from the oscillator X may be then multiplied five times in the multiplier M5, and passed through conductor 79 to the mixer 80, where it is mixed with the frequency from oscillator Y. Oscillator Y, however, has not been de-tuned because the bi-stable trigger II has been closed by the pulse in conductor 72, so that the normal frequency of oscillator Y is multiplied twice in the multiplier M2 and passed through conductor 81 to the mixer 80. In this mixer 80, a new frequency is produced which is the difference in the two frequencies in conductors 79 and 81. This new frequency may then be passed through conductor 82 and amplifier 83 into another mixer 85 wherein it may be mixed with the frequency from a fixed frequency oscillator Z, so that a further new frequency is produced which is the difference between that of oscillator Z and that from amplifier 83. This further new frequency may then be conducted through conductor 86 to the modulator PM as the base for the transmitting frequency of 87.15 megacycles (see FIG. 6) for transmission to the desired receiver fixedly tuned to this frequency.

If the control channel tone B is passed over conductor 36, then only the high pass filter HPF and filter BPB in FIG. 8*b* will be operated, and this in turn will produce a pulse which passes through diodes 63 and 64 and conductors 73, 71 to open the bi-stable trigger I as before, but this time also via conductor 74 to open the bi-stable trigger II which in turn operates the shape filter IIF to operate the de-tuner IID to change the frequency of the oscillations from oscillator Y, so that a different frequency is multiplied in the multiplier M2 and passed through conductor 81 to be mixed in mixer 80 with the previous detuned and multiplied frequency from the oscillator X. This new frequency in turn is passed through mixer 85 and to the modulator PM as the base for modulating the signal on a frequency of 87.20 megacycles, according to FIG. 6.

Similarly the channel band-pass filter BPC is opened for the channel tone C, which passes a pulse through rectifier 65 and 66 via conductors 75 and 74 to open bi-stable trigger II, and via conductor 76 to close the bi-stable trigger I. Thus the normal frequency of oscillator X is multiplied five times in the multiplier M5 for mixing in the mixer 80 together with detuned oscillations from oscillator Y via conductor 81, to produce the new frequency which is mixed with the frequency of oscillator Z and passed as a base for the 87.30 megacycle signal transmitting frequency according to FIG. 6.

And finally, for the transmitting frequency according to control tone D, band-pass filter BPD is operated to produce a pulse which passes diode 67 and 68 and conductors 77, 76 to close the bi-stable trigger I, and conductors 78 and 72 to close the bi-stable trigger II, so that only the normal frequencies from both oscillators X and Y are employed for producing the base for the carrier frequency of 87.25 megacycles according to FIG. 6.

FIG. 9 shows a table of the relationship of the mixings of the outputs of oscillators X and Y to produce the bases for the four different carrier frequencies corresponding to the control tones A, B, C and D shown in FIG. 6.

Thus by choosing the right oscillator, and multiplying and mixing circuits, four separate carrier frequency channels spaced by at least 50 kilocycles from each other can be obtained, so that each channel can easily be modulated with the deviation of 15 kilocycles of calling tone signals without causing interference between their overlapping spheres of action of adjacent transmitters simultaneously transmitting of adjacent ones of these carrier frequencies.

While there is described above the principles of this invention in connection with specific apparatus, it is to be clearly understood that this description is made only by way of example and not as a limitation to the scope of this invention.

What is claimed is:

1. A method for communicating multi-element code signals from a plurality of transmitters to a plurality of receivers, comprising:

(A) simultaneously transmitting different signals from adjacent transmitters, each of which simultaneously transmitted signals is modulated on a different carrier frequency, and (B) simultaneously switching said different carrier frequencies with their modulated signals cyclically among adjacent transmitters after simultaneously transmitting at least one signal over each of said transmitters, whereby the whole area covered by the spheres of action of said transmitters receives successively and repeatedly the signals on all of said different frequencies.

2. A method of telecommunication of multi-element code signals modulated on a plurality of different radio frequency carrier waves, over a plurality of transmitters located so their spheres of action completely cover an area, and so that adjacent transmitters have partly overlapping spheres of action, said method comprising the steps of:

(A) simultaneously transmitting said carrier frequencies, one at a time and modulated with said signals over said transmitters, and (B) repeating each signal a predetermined number of times modulated on the same carrier frequency from each of said transmitters, (C) receiving at one of a plurality of receivers locatable in said area a predetermined one of said carrier frequencies, and a predetermined signal modulated on part of said elements of said multi-element code signal, (D) controlling adjacent transmitters for transmitting simultaneously on different carrier frequencies for periods of time at least long enough for the transmission of one multi-element signal, and (E) simultaneously switching said carrier frequencies alternately among said adjacent transmitters whereby each transmitter sequentially transmits signals on each of said different frequencies, whereby said receivers can be moved all over said area without changing their reception frequencies and still receive the signals for which they have been tuned to respond.

3. A telecommunication system for multi-element code signals modulated on a plurality of different radio frequency carrier waves, said system comprising:

(A) a plurality of transmitters being located so that their spheres of action completely cover an area and adjacent transmitters have partly overlapping spheres of action, each transmitter having:

(a) means for transmitting each of said carrier frequencies one at a time modulated with said signals, and (b) means for repeating each signal a predetermined number of times modulated on the same carrier frequency;

(B) a plurality of receivers locatable in said area and each receiver having:

(a) means for receiving a predetermined one of said carrier frequencies; and (b) means for responding only to signals having a predetermined sequence of predetermined modulated calling elements in each multi-element signal;

(C) means for controlling adjacent transmitters for transmitting simultaneously on different carrier frequencies for periods of time at least long enough for the transmission of one multi-element signal; and (D) switching means for alternating said carrier frequencies among said adjacent stations, whereby each transmitter sequentially transmits signals on each of said different frequencies, whereby said receivers can be moved all over said area without changing their reception frequency and still receive the signal for which they have been tuned to respond.

4. A system according to claim 3 wherein the number of different carrier frequencies are four.

5. A system according to claim 3 wherein the means for controlling adjacent transmitters and the means for switching the carrier frequency are located in a central control station connected to each of the transmitters of the area.

6. A system according to claim 5 including a plurality of said central control stations for said area, and means for synchronizing the operation of said central control stations so that the carrier frequencies transmitted from all the transmitters in said area change simultaneously.

7. A radio telecommunication system for multi-element code signals, comprising:

(A) at least two transmitters, (B) a plurality of receivers, (C) means at each transmitter for generating at least two carrier frequencies for said signals being transmitted to said receivers, (D) control means connected to said transmitters for transmitting signals from one transmitter on one of said carrier frequencies and for simultaneously transmitting signals from the other transmitter on the other carrier frequency, and (E) means for alternating said carrier frequencies for transmitting said signals from said transmitters at intervals, wherein the dwell time between alternations is equal at least to the duration of one multi-element code signal.

8. A system according to claim 7 wherein said transmitters have adjacent and slightly overlapping areas of action.

9. A system according to claim 8 wherein each of the transmitters have substantially the same size area of action.

10. A system according to claim 7 wherein each transmitter transmits successively on each one of four different carrier frequencies.

11. A system according to claim 7 wherein said receivers are movable throughout said areas of action of said transmitters.

12. A system according to claim 7 including at least one central control station for at least a group of said transmitters including a switching means for controlling said means for alternating said carrier frequencies.

13. A system according to claim 12 including means in said central control station for generating different channel tones corresponding to said different carrier frequencies, means for modulating said tones with the multi-element code signals, and means in each transmitter for selecting said tone and generating the carrier frequency corresponding to said tone when said tone and signals are received from said central control station.

14. A system according to claim 13 wherein said means in each transmitter for selecting said tone and generating its corresponding carrier frequency comprises:

(A) band pass filters corresponding to each of said tones, (B) one fixed and two detunable oscillators for modulation of carrier frequencies, (C) a pair of bi-stable triggers controlled by said filters for controlling said detunable oscillators, (D) mixers for mixing the oscillations from all three of said oscillators to produce one of the four different carrier frequencies, corresponding to the tone filter, and (E) means for pulse modulating said code signal elements on said one produced carrier frequency.

15. A system according to claim 12 comprising a plurality of said central control stations for the transmitters in a given area, and including means for synchronizing the transmissions from all of said control stations.

References Cited by the Examiner

UNITED STATES PATENTS

| | | | |
|---|---|---|---|
| 1,403,835 | 1/1922 | Blackwell | 325—58 X |
| 1,751,516 | 3/1930 | Green | 343—208 X |
| 2,545,511 | 3/1951 | Brinkley | 325—154 X |

DAVID G. REDINBAUGH, *Primary Examiner.*

J. T. STRATMAN, *Assistant Examiner.*